United States Patent
Klein et al.

(10) Patent No.: US 11,848,017 B2
(45) Date of Patent: Dec. 19, 2023

(54) PRONOUN-BASED NATURAL LANGUAGE PROCESSING

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 17/343,996

(22) Filed: Jun. 10, 2021

(65) Prior Publication Data

US 2022/0399015 A1  Dec. 15, 2022

(51) Int. Cl.
| | |
|---|---|
| *G10L 15/00* | (2013.01) |
| *G10L 15/22* | (2006.01) |
| *G10L 15/26* | (2006.01) |
| *G06N 20/00* | (2019.01) |
| *G10L 15/08* | (2006.01) |

(52) U.S. Cl.
CPC .............. *G10L 15/22* (2013.01); *G06N 20/00* (2019.01); *G10L 15/26* (2013.01); *G10L 2015/088* (2013.01); *G10L 2015/223* (2013.01)

(58) Field of Classification Search
CPC ........... G10L 15/22; G06F 40/30; G06F 40/40
See application file for complete search history.

(56) References Cited

U.S. PATENT DOCUMENTS

| | | | |
|---|---|---|---|
| 11,074,412 B1* | 7/2021 | Leeman-Munk | G06N 3/08 |
| 2003/0101047 A1* | 5/2003 | Panttaja | G06F 40/30 |
| | | | 704/9 |
| 2006/0224570 A1* | 10/2006 | Quiroga | G06F 40/247 |
| | | | 707/E17.139 |
| 2018/0082680 A1* | 3/2018 | Pereg | G10L 15/1822 |
| 2018/0307671 A1* | 10/2018 | Yang | G06F 40/30 |
| 2020/0074322 A1* | 3/2020 | Chungapalli | G06N 20/20 |
| 2021/0158206 A1* | 5/2021 | Klein | G06F 40/30 |
| 2021/0334475 A1* | 10/2021 | He | G06F 40/40 |

OTHER PUBLICATIONS

Brunner, G. et al., "On identifiability in transformers," International Conference on Learning Representations, 2020, pp. 1-35.

Devlin, J. et al., "BERT: Pre-training of Deep Bidirectional Transformers for Language Understanding," arXiv:1810.04805v2 [cs.CL], May 24, 2019, 16 pages.

(Continued)

*Primary Examiner* — Daniel Abebe
(74) *Attorney, Agent, or Firm* — Sterne, Kessler, Goldstein & Fox P.L.L.C.

(57) ABSTRACT

Disclosed herein are various embodiments for pronoun-based natural language processing. An embodiment operates by receiving a plurality of text-based sentences each comprising a plurality of words, and each text-based sentence including a pronoun. A plurality of candidate nouns are identified amongst the plurality of words. A trigger word is identified from the plurality of words, wherein the trigger word is associated with both the pronoun and one of the plurality of candidate nouns. A score for each of the candidate nouns is received based on a relationship with the trigger word. The candidate noun with a highest score is selected as being associated with the pronoun.

20 Claims, 4 Drawing Sheets

(56) References Cited

OTHER PUBLICATIONS

Emami, A. et al., "A Knowledge Hunting Framework for Common Sense Reasoning," Proceedings of the 2018 Conference on Empirical Methods in Natural Language Processing, Oct. 31-Nov. 4, 2018, pp. 1949-1958.

Emami, A. et al., "The KnowRef Coreference Corpus: Removing Gender and Number Cues for Difficult Pronominal Anaphora Resolution," Proceedings of the 57th Annual Meeting of the Association for Computational Linguistics, Jul. 28-Aug. 2, 2019, pp. 3952-3961.

He, P. et al., "A Hybrid Neural Network Model for Commonsense Reasoning," Proceedings of the First Workshop on Commonsense Inference in Natural Language Processing, Nov. 3, 2019, pp. 13-21.

Kavumba, P. et al., "When Choosing Plausible Alternatives, Clever Hans can be Clever," Proceedings of the First Workshop on Commonsense Inference in Natural Language Processing, Nov. 3, 2019, pp. 33-42.

Klein, T. and Nabi, M., "Attention Is (not) All You Need for Commonsense Reasoning," Proceedings of the 57th Annual Meeting of the Association for Computational Linguistics, Jul. 28-Aug. 2, 2019, pp. 4831-4836.

Klein, T. and Nabi, M., "Contrastive Self-Supervised Learning for Commonsense Reasoning," Proceedings of the 58th Annual Meeting of the Association for Computational Linguistics, Jul. 5-10, 2020, pp. 7517-7523.

Klein, T. and Nabi, M., "Contrastive Self-Supervised Learning for Commonsense Reasoning," arXiv:2005.00669v1 [cs.CL], May 2, 2020, 7 pages.

Kocijan, V et al., "A Surprisingly Robust Trick for the Winograd Schema Challenge," Proceedings of the 57th Annual Meeting of the Association for Computational Linguistics (ACL), Jul. 28-Aug. 2, 2019, pp. 4837-4842.

Kocijan, V et al., "WikiCREM: A Large Unsupervised Corpus for Coreference Resolution," Proceedings of the 2019 Conference on Empirical Methods in Natural Language Processing (EMNLP), Nov. 3-7, 2019, pp. 4303-4312.

Lee, K et al., "End-to-end Neural Coreference Resolution," Proceedings of the 2017 Conference on Empirical Methods in Natural Language Processing, Sep. 7-11, 2017, pp. 188-197.

Levesque, H. et al., "The Winograd Schema Challenge," Proceedings of the Thirteenth International Conference on Principles of Knowledge Representation and Reasoning, 2012, pp. 552-561.

Liu, Y. et al., "RoBERTa: A Robustly Optimized BERT Pretraining Approach," arXiv:1907.11692v1 [cs.CL]. Jul. 26, 2019, 13 pages.

Marcus, G., "The Next Decade In AI: Four Steps Towards Robust Artificial Intelligence," downloaded from https://arxiv.org/abs/2002.06177, Feb. 17, 2020, pp. 1-59.

Opitz, J. and Frank, A., "Addressing The Winograd Schema Challenge as a Sequence Ranking Task," Proceedings of the First International Workshop on Language Cognition and Computational Models, Aug. 20, 2018, pp. 41-52.

Rahman, A. and NG, V., "Resolving Complex Cases of Definite Pronouns: The Winograd Schema Challenge," Proceedings of the 2012 Joint Conference on Empirical Methods in Natural Language Processing and Computational Natural Language Learning, Jul. 12-14, 2012, pp. 777-789.

Ruan, Y. et al., "Exploring Unsupervised Pretraining and Sentence Structure Modelling for Winograd Schema Challenge," arXiv:1904.09705v1 [cs.CL], Apr. 22, 2019, 7 pages.

Saba, W.S., "Is there a 'Simple' Machine Learning Method for Commonsense Reasoning?", Oct. 1, 2018, 4 pages.

Sakaguchi, K. et al., "WinoGrande: An Adversarial Winograd Schema Challenge at Scale," arXiv:1907.10641v2 [cs.CL], Nov. 21, 2019, 9 pages.

Tamborrino, A. et al., "Pre-training Is (Almost) All You Need: An Application to Commonsense Reasoning," arXiv:2004.14074v1 [cs.CL], Apr. 29, 2020, 10 pages.

Trichelair, P. et al., "How Reasonable are Common-Sense Reasoning Tasks: A Case-Study on the Winograd Schema Challenge and SWAG," Proceedings of the 2019 Conference on Empirical Methods in Natural Language Processing and the 9th International Joint Conference on Natural Language Processing, Nov. 3-7, 2019, pp. 3382-3387.

Trichelair, P. et al., "How Reasonable are Common-Sense Reasoning Tasks: A Case-Study on the Winograd Schema Challenge and SWAG," arXiv:1811.01778v2 [cs.LG], Sep. 10, 2019, 7 pages.

Trinh, T.H. and Le, Q.V., "A Simple Method for Commonsense Reasoning," arXiv:1806.02847v2 [cs.AI], Sep. 26, 2019, 12 pages.

Vig, J. and Belinkov, Y., "Analyzing the Structure of Attention in a Transformer Language Model," Proceedings of the Second BlackboxNLP Worksop on Analyzing and Interpreting Neural Networks for NLP, Aug. 1, 2019, pp. 63-76.

Wolf, T. et al. "Transformers: State-of-theArt Natural Language Processing," arXiv:1910.03771v5 [cs.CL], Jul. 14, 2020, 8 pages.

Yang, H. et al., "Supervised Learning of Semantics-Preserving Hash via Deep Convolutional Neural Networks," IEEE Transactions on Pattern Analysis and Machine Intelligence, arXiv:1507.00101v2 [cs.CV], Feb. 14, 2017, 15 pages.

Ye, Z. et al., "Align, Mask and Select: A Simple Method for Incorporating Commonsense Knowledge into Language Representation Models," arXiv:1908.06725v5 [cs.CL], May 6, 2020, 10 pages.

Zhang, T. et al., "BERTScore: Evaluating Text Generation with Bert," ICLR 2020, arXiv:1904.09675v3 [cs.CL], Feb. 24, 2020, 43 pages.

* cited by examiner

FIG. 1

{ The trophy does not fit in the suitcase because it is too small

Trophy:

205A
| 0.1 | 0 | 0.4 |
| 0.2 | 0.6 | 0.4 |
| 0.1 | 0.1 | 0.3 |

224A
| 0.1 | 0.3 | 0.2 |
| 0.3 | 0 | 0.2 |
| 0.9 | 0.3 | 0.8 |

Suit case:

PRONOUN-BASED NATURAL LANGUAGE PROCESSING

BACKGROUND

With the rise in the popularity of bots, voice responsive devices (VRDs), and artificial intelligence (AI) natural language processing (NLP) have become increasingly important fields in computing. NLP is when a computing device tries to understand a sentence that is provided by a user in the same way a human would understand the sentence. However, because human speech has many ambiguities, it is often difficult for a computing device to identify the intent behind a sentence or particular words within the sentence.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

With the rise in the popularity of bots, voice responsive devices (VRDs), and artificial intelligence (AI) natural language processing (NLP) have become increasingly important fields in computing. NLP is when a computing device tries to understand a sentence that is provided by a user in the same way a human would understand the sentence. However, because human speech has many ambiguities, it is often difficult for a computing device to identify the intent behind a sentence or particular words within the sentence.

Figure 1:
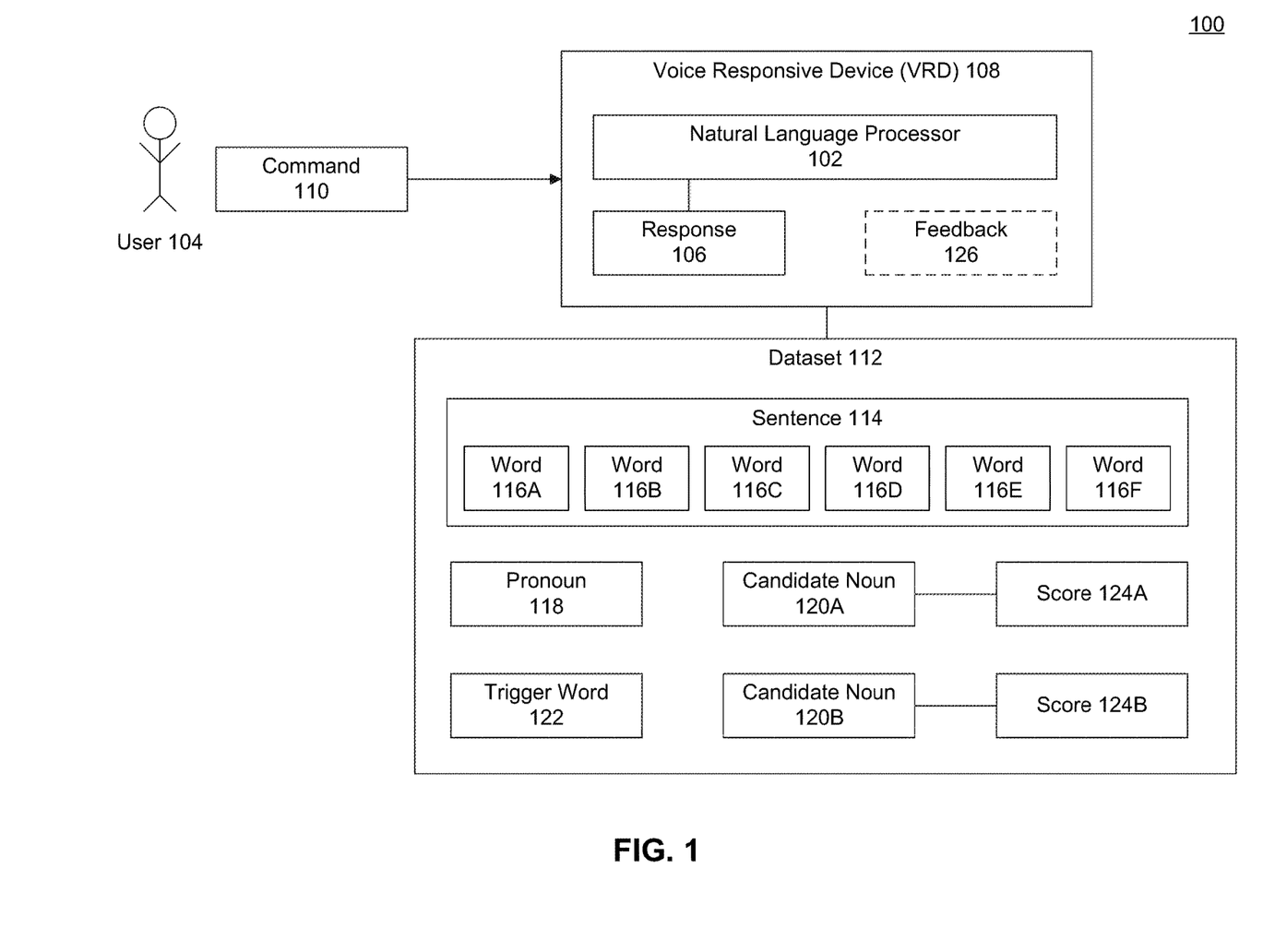
FIG. 1 is a block diagram illustrating functionality related to pronoun-based natural language processing, according to some example embodiments.

FIG. 1 is a block diagram 100 illustrating functionality related to pronoun-based natural language processing, according to some example embodiments. A natural language processor (NLP) 102 may be configured to receive and respond to comments or commands from a user 104. NLP 102 may be designed to receive any speech or noise, and identify one or more commands 110 from within the received speech or noise. Based on the identification of a command 110, or its understanding of a sentence provided by user 104, NLP 102 may perform a task, send a notification to another system, or otherwise provide a response 106.

In some embodiments, NLP 102 may be communicatively coupled with a voice responsive device (VRD) 108. Example VRDs 108 include, but are not limited to, AMAZON ALEXA, GOOGLE HOME, and APPLE SIRI. A user 104 may then speak a command 110 which may be received through an input port or a microphone of VRD 108. Command 110 may be any speech that is spoken, typed, or otherwise input by user 104. Command 110 may include one or more sentences 114, and may include specific command words for particular tasks to be performed. In some embodiments, the command 110 may be received as an audio command or speech that is translated into text by a speech-to-text translation engine (not shown). NLP 102 may then receive the text version of the command 110 to process as described herein.

NLP 102 is communicatively coupled to VRD 108. In some embodiments, this communicative coupling may include NLP 102 being a built-in functionality within a VRD 108, and in other embodiments, NLP 102 may be accessible to VRD 108 over a network. For example, NLP 102 may be operational from a cloud computing system that is communicatively coupled to VRD 108 over the Internet.

VRD 108 is one example of a device that utilize the functionality of NLP 102 as described herein. In some other embodiments, NLP 102 may be configured to operate with devices other than VRD 108. For example, NLP 102 may be configured to operate in conjunction with a web application such as a bot. The bot may be configured to receive and respond to commands 110 entered by a user 104 through a mobile phone or other computing device in a chat or other messaging interface. In other embodiments, NLP 102 may be applied to other robotics, computing, or artificial intelligence systems.

In some embodiments, NLP 102 may be a neural network or machine learning system trained to perform language processing using a dataset 112. Dataset 112 may be training data that is used to train NLP 102 to be able to process, understand, or respond to commands 110 from a user 104 across one or more platforms or services. The training data may include a set of examples of sentences 114, and how NLP 102 is to process, breakdown, or otherwise understand the sentences 114. The examples may include both positive examples of desired or intended language processing, and negative examples of errors or invalid language processing.

Machine learning models can be trained using algorithms readily understood by one skilled in the relevant arts, such as logic regression, support vector machine (SVM), or random forests. If the dataset 112 is highly non-linear, for example, deep neural networks can be used. The datasets 112 used for training and test can be split into positive and negative samples, where an entity on which intents are created can be treated as a positive sample, and an entity on which intents are not created can be treated as a negative sample.

Dataset 112 may include any number of sentences, though for the sake of simplicity, only a single sentence 114 is illustrated. The sentence 114 may include a number of different words 116A-F. In different sentences 114, the number of words 116 and the actual words used in any sentence may vary.

In some embodiments, dataset 112 may be directed to training NLP 102 to understand how pronouns 118 are used in sentences 114. A pronoun 118 may be a word that takes the place of or otherwise refers to a noun. Example pronouns 118 may include: he, she, it, they, someone, who. A pronoun 118 may reference another noun in the same sentence 114, or even a previous sentence.

In some embodiments, dataset 112 may include simple sentences and/or complex sentences. In a simple sentence, with only one noun, it may be relatively straightforward or simple to identify to which noun, a pronoun refers. For example, in the sentence "The dog was hot, so it drank water," the pronoun 118 "it" refers to the "dog."

In complex sentences the pronoun 118 may be a little more difficult to identify because there may be different nouns to which the pronoun 118 may be referring. An example of a more complex sentence may be "The trophy does not fit in the suitcase, because it was too small." In this case, the pronoun 118 "it" may refer to either "trophy" or "suitcase". "Trophy" and "suitcase" are examples of candidate nouns 120A-B to which the pronoun 118 may refer. The only way to determine the noun to which candidate noun 120A-B, the pronoun 118 "it" is referring, is from understanding the context of at least another portion of the sentence.

This other portion of the sentence, which may be relevant in determining to which candidate noun 120A-B the pronoun 118 may be referring, is referred to as the trigger word 122. A trigger word 122 may be one or more words 116A-F or phrases associated with the pronoun 118 and may be used to help determine to which candidate noun 120A, 120B, the pronoun 118 refers. In the example sentence "The trophy does not fit in the suitcase, because it was too small," "too small" may be the trigger words 122. Thus, from the trigger word 122 or context of "too small" it is clear that the pronoun 118 "it" is referring to the "suitcase."

In some embodiments, dataset 112 may various examples of both simple and complex sentences with identified words 116A-F, pronouns 118, candidate nouns 120A-B, and trigger words 122.

In some embodiments, dataset 112 may include two or more complex sentences with different trigger words 122 which change the meaning of the sentence 114 and the pronoun 118. In continuing the example above, a first sentence 114 may be "The trophy did not fit into the suitcase, because it was too small" and the second sentence 114 may be "The trophy did not fit into the suitcase, because it was too big." In the first sentence the trigger word 122 "small" may indicate the pronoun 118 is "suitcase," while in the second sentence, the trigger word 122 "big" may indicate that the pronoun 118 is referring to "trophy".

In some embodiments, dataset 112 may include compound sentences, or two sentences 114 that are to be processed together. For example, if a sentence 114 with a pronoun 118 does not include a noun other than the pronoun 118, the NLP 102 may be trained to analyze the previous sentence 114 to identify the candidate nouns 120A-B. For example, a sentence 114 may be "Later in the day it took a nap." This sentence 114 includes a pronoun 118 "it", however it is ambiguous as to what noun "it" is referring. Dataset 112 may include a prior sentence 114 "The dog was tired." NLP 102 may be configured to read both sentences 114 together "The dog was tired. Later in the day it took a nap." to determine that the pronoun 118 "it" is referring to "dog" in the previous sentence 114.

In some embodiments, each candidate noun 120A, 120B may include a score 124A, 124B, generally referred to "score 124". In some embodiments, score 124 may be generated based, at least in part on the TRANSFORMER architecture for natural language processing. The TRANSFORMER is an example of a deep learning model that utilizes attention. Attention may be a mechanism that is used to identify words 116A-F of the input data or sentence 114 more important than words 116A-F of the sentence 114. In some embodiments, the TRANSFORMER may include identifying tokens or words 116A-F within a sentence 114, and assigning weights or scores 124 to the words 116A-F based on their relative importance in the sentence 114, based on the model. In some embodiments, the attention mechanism may be used to determine or establish a local context or importance.

In some embodiments, scoring performed by NLP 102 based on training on dataset 112 may modify the importance or weights assigned to various words 116A-F in a sentence 114 from what is provided in the TRANSFORMER architecture. This scoring modification may help identify which candidate noun 120A-B is being referred to when a prounoun 118 is identified in the sentence 114. Then, for example, the highest scoring candidate noun 120A, 120B may be selected as the noun to which the pronoun 118 refers. This may then further enable NLP 102 to understand and generate a response 106 to command 110.

Once NLP 102 has been trained on dataset 112, NLP 102 may use machine learning, deep learning, or neural networks, may receive and respond to commands 110 from users 104. In some embodiments, NLP 102 may receive feedback 126 about whether the responses 106 infer an accurate interpretation of command 110, and may further refine its natural language processing capabilities.

Figure 2:
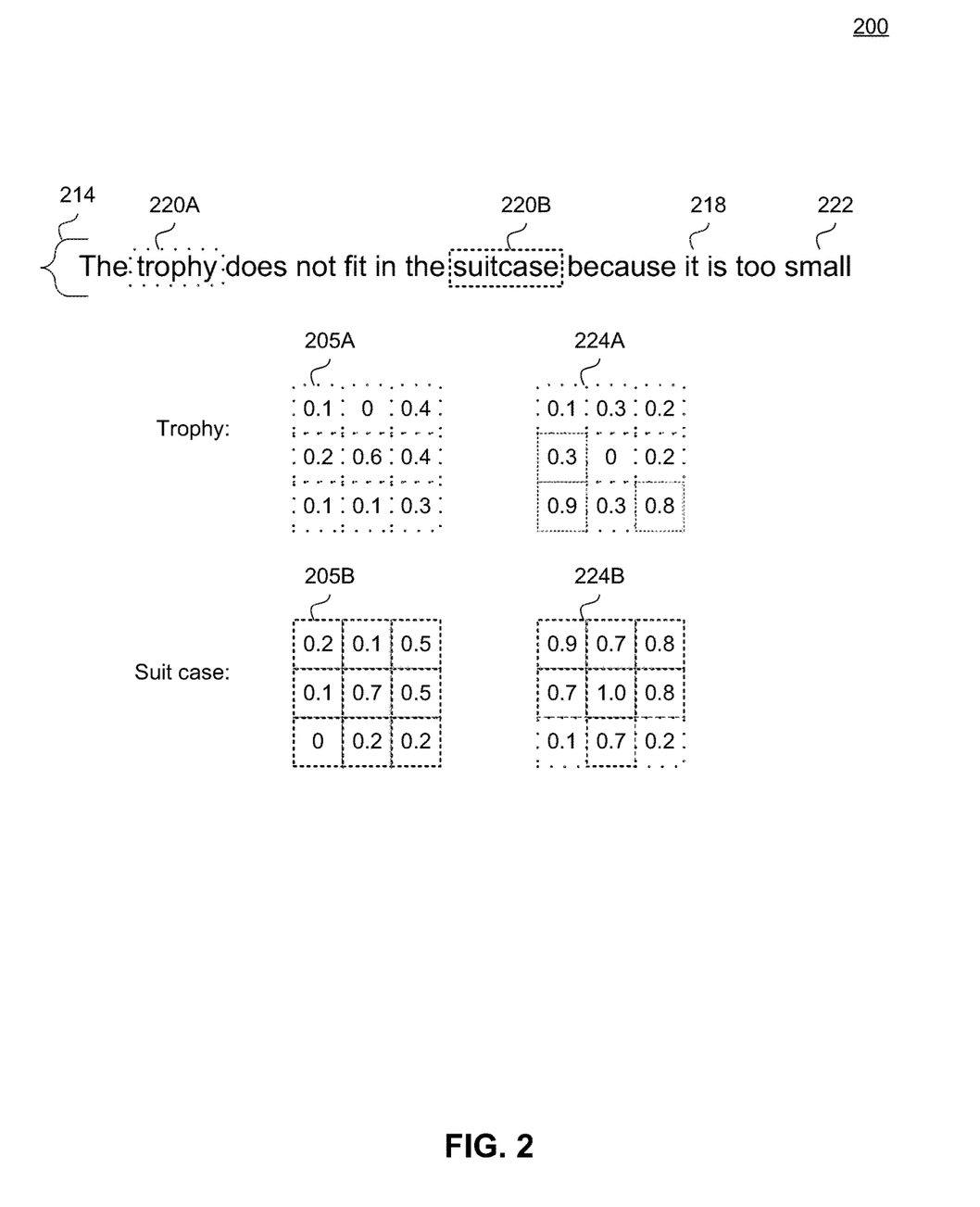
FIG. 2 is a block diagram illustrating functionality related to scoring candidate nouns in pronoun-based natural language processing, according to some example embodiments.

FIG. 2 is a block diagram 200 illustrating functionality related to scoring candidate nouns in pronoun-based natural language processing, according to some example embodiments. An example sentence 214 is illustrated with pronoun 218 "it", trigger word 222 "small" and candidate nouns 220A, 220B "trophy" and "suitcase".

Scoring grids 205A, 205B includes example scores that may be generated based on the TRANSFORMER architecture in which weights as assigned to the words based on relative importance. Scoring grid 205A corresponds to trophy, and scoring grid 205B corresponds to suitcase.

Scoring grids 224A, 224B include example scores 124 generated by NLP 102 based on the training dataset 112 described above with respect to FIG. 1. Scoring grid 224A corresponds to trophy, and scoring grid 224B corresponds to suitcase.

In some embodiments, a machine learning system using only the TRANSFORMER architecture (without dataset 112 training) may receive or generate scoring grids 205A, 205B. The machine learning system may then compare the scores in the scoring grids 205A, 205B to each other to identify the candidate noun 120A-B.

For example, in the second row of the grids 205A, 205B, the first values "0.2" and "0.1" may be compared to one another, and from this comparison, it may be determined (incorrectly) that trophy is the candidate noun 220A to which pronoun 218 is referring. The third values in the second row 0.4 and 0.5 may indicate that suitcase is the candidate noun 220B to which pronoun 218 is referring, however the values are very close together, thus the confidence level may be low.

Through pronoun-based training with dataset 112, NLP 102 may improve its processing and scoring of the candidate nouns 220A-220B, which enables NLP 102 to confidently select the proper candidate noun 220A, 220B. For example, in the second row of the grids 224A, 224B, the first values "0.3" and "0.7" may be compared to one another, and from this comparison, it may be determined with high confidence that suitcase is the candidate noun 220B to which pronoun 218 is referring. Similarly, the third values in the second row 0.2 and 0.8 may produce a similar high confidence conclusion that suitcase is the candidate noun 220B to which pronoun 218 is referring.

This increased variance may increase the confidence score in selecting the correct word, suitcase referring to the pronoun and may increase the likelihood of success in correcting interpreting and responding to the sentence 214.

Figure 3:
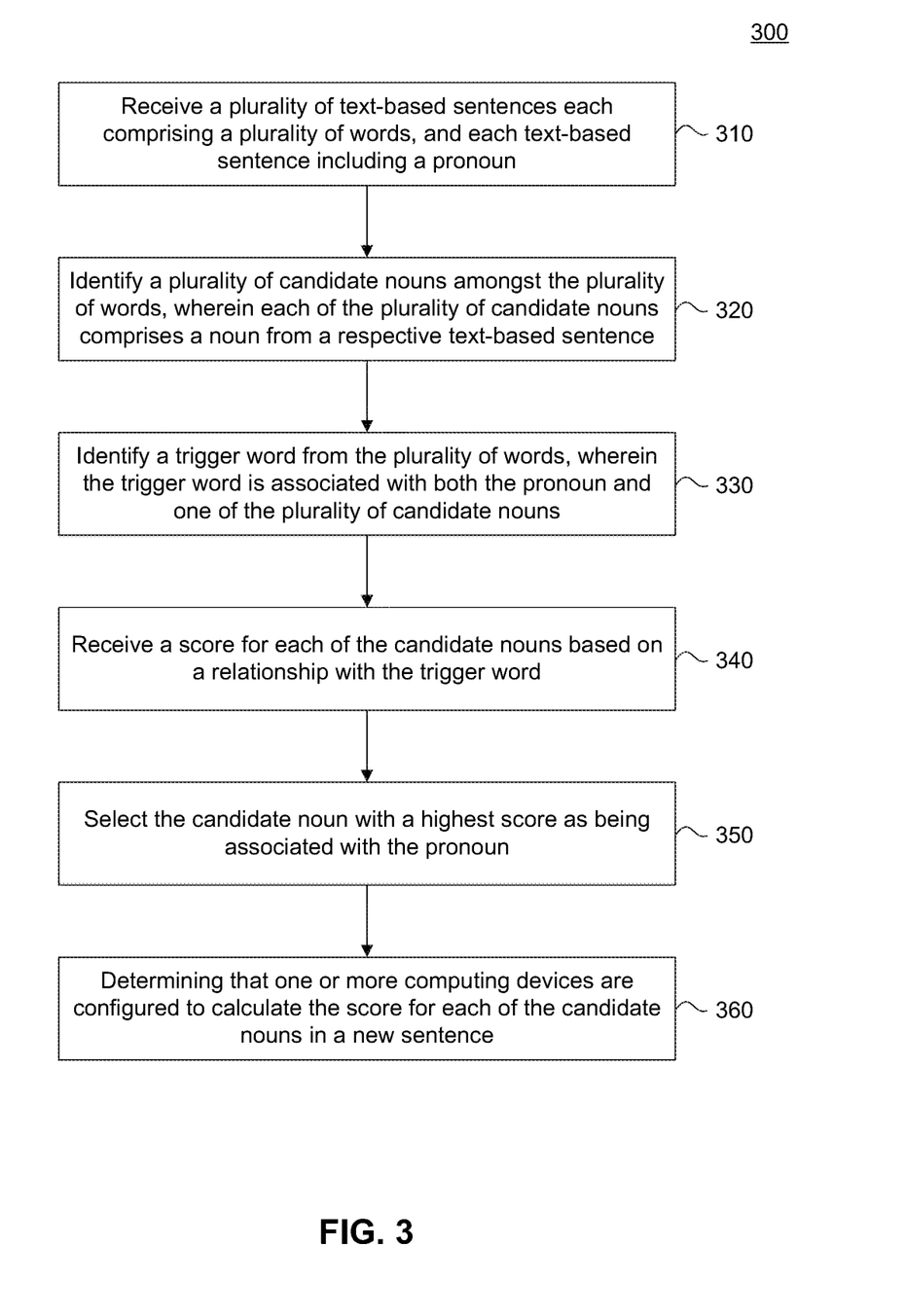
FIG. 3 is a flowchart illustrating example operations for functionality related to pronoun-based natural language processing, according to some embodiments.

FIG. 3 is a flowchart illustrating example operations for functionality related to pronoun-based natural language processing, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

In 310, a plurality of text-based sentences each comprising a plurality of words is received, each text-based sentence including a pronoun. For example, dataset 112 may include hundreds or thousands of simple, complex, or compound sentences 114, with different numbers of words 116A-F. The words 116A-F may include a pronoun 118.

In 320, a plurality of candidate nouns is identified amongst the plurality of words, wherein each of the plurality of candidate nouns comprises a noun from a respective text-based sentence. For example, candidate nouns 120A, 120B may include any nouns amongst the words 116A-F in the sentence 114 that are used to refer to the pronoun 118.

In 330, a trigger word is identified from the plurality of words, wherein the trigger word is associated with both the pronoun and one of the plurality of candidate nouns. For example, trigger word 122 may include any word(s) 116A-F that are helpful in identifying which candidate noun 120A, 120B correspond to the pronoun 118.

In 340, a score for each of the candidate nouns is received based on a relationship with the trigger word. For example, if multiple candidate nouns 120A, 120B are identified, then scores 124A, 124B may be beneficial in identifying which candidate noun 120A, 120B is being referred to by the pronoun 118. In embodiments in which only one candidate noun 120A is identified, scoring may be moot and skipped.

In 350, the candidate noun with a highest score is selected as being associated with the pronoun. For example, the candidate noun 120A, 120B with the highest score(s) or greatest variances in scoring grids (see FIG. 2) may be selected as a replacement for the pronoun 118 in interpreting the sentence 114.

In 360, it is determined that the one or more computing devices are configured to calculate the score for each of the candidate nouns in a new sentence. For example, once trained on dataset 112, NLP 102 may be able to identify the pronoun(s) 118, candidate noun(s) 120A, 120B, trigger word(s) 122, and perform the scoring or generate scoring grids 224A, 224B, to select the proper candidate noun 120A, 120B.

Figure 4:
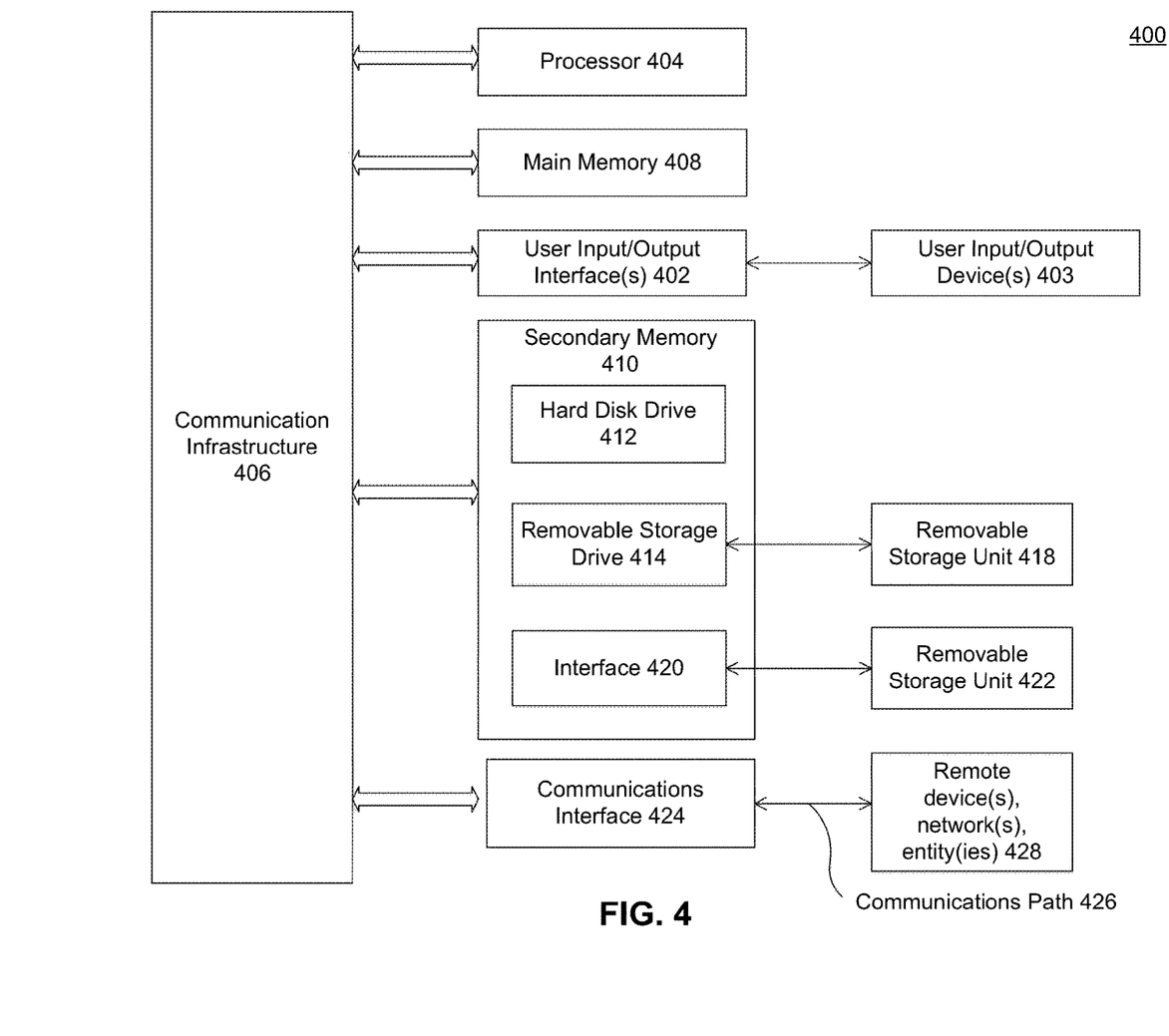
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

receiving, by one or more computing devices, a plurality of text-based sentences each comprising a plurality of words, and each of the plurality of text-based sentences including a pronoun;

for each of the plurality of text-based sentences, performing:

identifying a plurality of candidate nouns amongst the plurality of words, wherein each of the plurality of candidate nouns comprises a noun from a respective text-based sentence;

identifying a trigger word from the plurality of words, wherein the trigger word is associated with both the pronoun and one of the plurality of candidate nouns;

generating a first scoring grid for a first candidate noun of the plurality of candidate nouns based on a relationship with the trigger word;

generating a second scoring grid for a second candidate noun of the plurality of candidate nouns based on a relationship with the trigger word, each scoring grid comprising a plurality of scores for a respective one of the plurality of candidate nouns;

comparing the plurality of scores across the first scoring grid and the second scoring grid for each of the first candidate noun and the second candidate noun; and selecting the first candidate noun with a highest relevancy as being associated with the pronoun as determined based on the comparing.

2. The method of claim 1, further comprising:

receiving, by the one or more computing devices, the new sentence comprising a new plurality of words, including a new pronoun;

identifying a new plurality of candidate nouns amongst the new plurality of words, wherein each of the new plurality of candidate nouns comprises a new noun from the new sentence;

identifying a new trigger word from the plurality of new words, wherein the new trigger word is associated with both the new pronoun and one of the plurality of new candidate nouns;

calculating a new score for each of the plurality of new candidate nouns based on a relationship with the new trigger word; and selecting a new candidate noun with a highest score as being associated with the new pronoun.

3. The method of claim 1, wherein the score comprises a plurality of weights assigned to a subset of the plurality of words.

4. The method of claim 3, wherein the plurality of weights are based on a TRANSFORMER architecture of the natural language processing.

5. The method of claim 1, further comprising:
performing, by the one or more computing devices after the determining, the natural language processing on the new sentence.

6. The method of claim 3, wherein the natural language processing comprises:
receiving, from a user, the new sentence as audio received from a voice responsive device;
converting the audio into text corresponding to the new sentence;
performing the natural language processing on the text corresponding to the new sentence; and
providing a response to the voice responsive device, wherein the voice responsive device is configured to audibly output the response to the user.

7. The method of claim 4, further comprising:
activating an application responsive to the natural language processing.

8. The method of claim 1, further comprising determining a confidence score based on a variance between a first value from the first scoring grid and a corresponding second value from the second scoring grid.

9. A system, comprising:
a memory; and
at least one processor coupled to the memory and configured to perform instructions that cause the at least one processor to perform operations comprising:
receiving a plurality of text-based sentences each comprising a plurality of words, and each of the plurality of text-based sentences including a pronoun;
for each of the plurality of text-based sentences, performing:
identifying a plurality of candidate nouns amongst the plurality of words, wherein each of the plurality of candidate nouns comprises a noun from a respective text-based sentence;
identifying a trigger word from the plurality of words, wherein the trigger word is associated with both the pronoun and one of the plurality of candidate nouns;
generating a first scoring grid for a first candidate noun of the plurality of candidate nouns based on a relationship with the trigger word;
generating a second scoring grid for a second candidate noun of the plurality of candidate nouns based on a relationship with the trigger word, each scoring grid comprising a plurality of scores for a respective one of the plurality of candidate nouns;
comparing the plurality of scores across the first scoring grid and the second scoring grid for each of the first candidate noun and the second candidate noun; and
selecting the first candidate noun with a highest relevancy as being associated with the pronoun as determined based on the comparing.

10. The system of claim 9, the operations further comprising:
receiving a new sentence comprising a new plurality of words, including a new pronoun;
identifying a new plurality of candidate nouns amongst the new plurality of words, wherein each of the new plurality of candidate nouns comprises a new noun from the new sentence;
identifying a new trigger word from the plurality of new words, wherein the new trigger word is associated with both the new pronoun and one of the plurality of new candidate nouns;
calculating a new score for each of the plurality of new candidate nouns based on a relationship with the new trigger word; and
selecting a new candidate noun with a highest score as being associated with the new pronoun.

11. The system of claim 9, wherein the score comprises a plurality of weights assigned to a subset of the plurality of words.

12. The system of claim 11, wherein the plurality of weights are based on a TRANSFORMER architecture of natural language processing.

13. The system of claim 9, the operations further comprising:
performing, by the one or more computing devices after the determining, natural language processing on the new sentence.

14. The system of claim 13, wherein the natural language processing comprises:
receiving, from a user, a new sentence as audio received from a voice responsive device;
converting the audio into text corresponding to the new sentence;
performing the natural language processing on the text corresponding to the new sentence; and
providing a response to the voice responsive device, wherein the voice responsive device is configured to audibly output the response to the user.

15. The system of claim 14, the operations further comprising:
activating an application responsive to the natural language processing.

16. A non-transitory computer-readable medium having instructions stored thereon that, when executed by at least one computing device, cause the at least one computing device to perform operations comprising:
receiving a plurality of text-based sentences each comprising a plurality of words, and each of the plurality of text-based sentences including a pronoun;
for each of the plurality of text-based sentences, performing:
identifying a plurality of candidate nouns amongst the plurality of words, wherein each of the plurality of candidate nouns comprises a noun from a respective text-based sentence;
identifying a trigger word from the plurality of words, wherein the trigger word is associated with both the pronoun and one of the plurality of candidate nouns;
generating a first scoring grid for a first candidate noun of the plurality of candidate nouns based on a relationship with the trigger word;
generating a second scoring grid for a second candidate noun of the plurality of candidate nouns based on a relationship with the trigger word each scoring grid comprising a plurality of scores for a respective one of the plurality of candidate nouns;
comparing the plurality of scores across the first scoring grid and the second scoring grid for each of the first candidate noun and the second candidate noun; and selecting the first candidate noun with a highest relevancy as being associated with the pronoun as determined based on the comparing.

17. The non-transitory computer-readable medium of claim 16, the operations further comprising:
receiving a new sentence comprising a new plurality of words, including a new pronoun;
identifying a new plurality of candidate nouns amongst the new plurality of words, wherein each of the new plurality of candidate nouns comprises a new noun from the new sentence;
identifying a new trigger word from the plurality of new words, wherein the new trigger word is associated with both the new pronoun and one of the plurality of new candidate nouns;
calculating a new score for each of the plurality of new candidate nouns based on a relationship with the new trigger word; and
selecting a new candidate noun with a highest score as being associated with the new pronoun.

18. The non-transitory computer-readable medium of claim 16, wherein the score comprises a plurality of weights assigned to a subset of the plurality of words.

19. The non-transitory computer-readable medium of claim 18, wherein the plurality of weights are based on a TRANSFORMER architecture of natural language processing.

20. The non-transitory computer-readable medium of claim 16, wherein the natural language processing comprises:
receiving, from a user, a new sentence as audio received from a voice responsive device;
converting the audio into text corresponding to the new sentence;
performing the natural language processing on the text corresponding to the new sentence; and
providing a response to the voice responsive device, wherein the voice responsive device is configured to audibly output the response to the user.

* * * * *